(12) United States Patent
Miguel et al.

(10) Patent No.: US 8,790,737 B2
(45) Date of Patent: Jul. 29, 2014

(54) CHOCOLATE WITH AGGLOMERATE STRUCTURE AND THE METHOD FOR PREPARING THEREOF

(75) Inventors: José Fernando Galdón Miguel, Quart de Poblet (ES); Miguel Ángel Puente Tomas, Quart de Poblet (ES); Arturo Fernando Mascarós Torres, Quart de Poblet (ES); Susana Méndez Plaza, Quart de Poblet (ES)

(73) Assignee: Natra Cacao, S.L. Unipersonal, Quart de Pablet Valencia (ES)

(*) Notice: Subject to any disclaimer, the term of this patent is extended or adjusted under 35 U.S.C. 154(b) by 41 days.

(21) Appl. No.: 13/529,144

(22) Filed: Jun. 21, 2012

(65) Prior Publication Data

US 2013/0046027 A1 Feb. 21, 2013

(30) Foreign Application Priority Data

Aug. 16, 2011 (EP) .................................. 11382280

(51) Int. Cl.
*A23G 1/00* (2006.01)
(52) U.S. Cl.
USPC .......................................... 426/631; 426/285
(58) Field of Classification Search
USPC ............................................ 426/631, 285, 98
See application file for complete search history.

(56) References Cited

U.S. PATENT DOCUMENTS

| | | | |
|---|---|---|---|
| 2,201,820 A | | 5/1940 | Zizinia et al. |
| 2,399,195 A | | 4/1946 | Bodenhelm |
| 2,850,388 A | * | 9/1958 | Peebles et al. ................. 426/285 |
| 3,013,881 A | * | 12/1961 | Carlson et al. ................. 426/285 |
| 4,308,288 A | * | 12/1981 | Hara et al. ..................... 426/285 |
| 4,338,349 A | * | 7/1982 | Franklin et al. ................ 426/631 |
| 4,980,181 A | * | 12/1990 | Camp et al. ..................... 426/98 |
| 5,264,228 A | * | 11/1993 | Pray et al. ...................... 426/285 |
| 6,007,857 A | * | 12/1999 | Kimura et al. ................. 426/285 |
| 6,117,478 A | * | 9/2000 | Dubberke ..................... 426/631 |

FOREIGN PATENT DOCUMENTS

CH 405 908 1/1996

OTHER PUBLICATIONS

Afoakwa, E.O. et al., "Factors influencing rheological and textural qualities in chocolate—a review", Trends in Food Science and Technology, 2007, vol. 18, pp. 290-298.
Corrigan, O.I., "Thermal analysis of spray dried products", Thermochimica Acta, 1995, vol. 248, pp. 245-258.
Palzer, S., "The effect of glass transition on the desired and undesired agglomeration of amorphous food powders", Chemical Engineering Science, 2005, vol. 60, pp. 3959-3968.
Directive 2000/36/EC of the European Parliament of the Council, relating to cocoa and chocolate products intended for human consumption, published Jun. 23, 2000.
Extended European Search Report issued by the International Searching Authority (ISA/O.E.P.M.) on Jan. 10, 2012 in connection with EP 11 38 2280.
Extended European Search Report issued by the European Patent Office on Jan. 10, 2012 in connection with European Patent Application EP 11 38 2280.

* cited by examiner

*Primary Examiner* — Carolyn Paden
(74) *Attorney, Agent, or Firm* — Gary J. Gershik; Cooper & Dunham LLP

(57) ABSTRACT

The present invention relates to a method for preparing chocolate with agglomerate structure. It also relates to the chocolate obtained by said method characterized in that has the organoleptic characteristics of the conventional chocolate, it is physico-chemically stable at a temperature greater than or equal to 40° C., maintains its flowability at a temperature of up to 50° C. and is crunchy.

20 Claims, No Drawings

CHOCOLATE WITH AGGLOMERATE STRUCTURE AND THE METHOD FOR PREPARING THEREOF

This application claims priority of European Patent Application No. EP 113 822 80.3, filed Aug. 16, 2011, the entire contents of which are hereby incorporated by reference into this application.

FIELD OF THE INVENTION

The present invention belongs to the food field, particularly to the chocolate industry. It specifically relates to a method for preparing chocolate with agglomerate structure. It also relates to the chocolate obtained by said method and to the use thereof. The chocolate obtained by the method of the invention is characterized in that it has the organoleptic characteristics of conventional chocolate, it is physico-chemically stable at a temperature greater than or equal to 40° C. maintains its flowability at a temperature of up to 50° C. and is crunchy.

BACKGROUND OF THE INVENTION

Chocolate is a highly energetic food with a high fat content. Currently and at the European level, the composition, sales description and definition of the different types of chocolate are legally determined by Directive 2000/36/EC of the European Parliament and of the Council of 23 Jun. 2000 relating to cocoa and chocolate products intended for human consumption. Conventional chocolate can be in solid phase and in liquid phase. Generally, in solid phase (droplets, bars, chips and microdroplets, powder) the chocolate quality is assured for 2 years. The chocolate in liquid phase must be stored at a temperature close to the 45° C. and maintained under gentle stirring causing an expensive storage, handling and transportation. In these conditions the quality of the chocolate in liquid phase is assured for four months.

One of the ways for improving the transportation, handling and dosage conditions of the chocolate is to obtain it in the agglomerate powder form. Furthermore, this type of chocolate agglomerate requires much less expensive storage conditions with respect to a conventional chocolate in liquid phase or in solid phase since only the humidity needs to be preserved. The storage time, assuring the quality of the chocolate agglomerate powder, is equivalent to that of a conventional chocolate in solid phase.

One of the most used techniques in food industry for obtaining food powder is agglomeration. Agglomeration can be defined, in general, as a process during which primary particles are bound such that large porous particles are formed (Palzer S., 2005, *"The effect of glass transition on the desired and undesired agglomeration of amorphous food powders."Chemical Engineering Science*, 60: 3959-3968). Certain physical properties of the food powder such as the apparent density, flowability and dispersibility are improved with agglomeration. Thus, the agglomerate products have a series of advantages such as the wettability and solubility making handling them by the consumers easier and they are therefore preferred against the traditional non-agglomerate products. However, agglomerating foods with a high fat content such as chocolate have not been achieved until now.

There are several patents and patent applications describing the use of agglomeration to obtain chocolate, but only agglomerating chocolate with low fat content (less than 18%) has been achieved. Lowering the fat content of the chocolate entails, besides a series of technical limitations, a huge drawback in terms of maintaining the organoleptic characteristics of the conventional chocolate and the palatability (resulting in a chocolate with a less pleasant texture). Until now, a chocolate with agglomerate structure which maintains the organoleptic characteristics and the nutritional profile of conventional chocolate of which the fat content, depending on the type of chocolate, can vary from 18 to 53% by weight (Directive 2000/36/EC) has not been achieved. In the terms of the present invention, conventional chocolate (also known as ordinary chocolate) is understood as that obtained by following the conventional method for preparing chocolate widely described in the state of the art, such as for example in the review by Afoakwa and Fowler (*"Factors influencing rheological and textural qualities in chocolate—a review"*. Trends in Food Science and Technology, 18, 290-298 (2007)).

As has been previously mentioned, different patents and patent applications describe the use of the agglomeration to prepare chocolate agglomerate with a low fat content. International patent application WO 02/087351 describes a method in which granulated chocolate powder with a fat content of 18% is prepared. In said method the reduced fat chocolate powder is treated with steam to generate an agglomerate which is subsequently granulated by means of drying. On the other hand, patent EP 0941666 describe a process for obtaining chocolates agglomerate with low fat content in which water is mixed with sucrose, cocoa mass, cocoa butter and milk derivatives which are subsequently subjected to a process of agglomerating at low temperatures using a lyophilizer. In this patent the author uses the term chocolate to refer to a product similar to milk chocolate which does not meet the Directive 2000/36/EC in terms of minimum fat content required for the milk chocolate (25% by weight). The chocolate analogs generally have organoleptic characteristics like the conventional chocolate and normally include cocoa derivatives in their composition. In the terms of the present invention, chocolate analog is understood as that product which does not meet the Directive 2000/36/EC and which is marketed as food product equivalent to the chocolate. Among the chocolate analogs are those chocolates with a low fat content. They also include the products prepared from cocoa derivatives and fats different from the cocoa butter but not equivalents and the products having in their composition more than 5% of fats equivalent to the cocoa butter.

Therefore, unlike the processes disclosed in the mentioned documents, a true chocolate with agglomerate structure having the organoleptic characteristics of the conventional chocolate and meeting the Directive 2000/36/EC is obtained with the method of the present invention. Furthermore, it is physico-chemically stable at a temperature greater than or equal to 40° C., maintains its flowability at a temperature of up to 50° C. and is crunchy.

SUMMARY OF THE INVENTION

In view of the foregoing, the present invention deals with the problem existing in the state of the art for providing a chocolate with agglomerate structure which has a fat content between 18% and the 53% by weight, meets the Directive 2000/36/EC and maintains the organoleptic characteristics of the conventional chocolate.

One aspect of the present invention relates to the method for preparing chocolate with agglomerate structure which comprises the following steps:
  a) adding an amount of liquid phase greater than 10% by weight to starting chocolate,
  b) heating and homogenizing the mixture at a temperature between 30° C. and 80° C., and c) drying the mixture obtained in step b) by evaporation at a temperature between 30° C. and 200° C. and at pressures between 1000 mbar and 5 mbar, until obtaining a residual moisture less than or equal to 5%.

Another aspect of the invention relates to the chocolate with agglomerate structure obtained by said method characterized in that it is physico-chemically stable at a temperature greater than or equal to 40° C., maintains its flowability at a temperature of up to 50° C. and is crunchy.

Another aspect of the invention relates to the use of the same for direct consumption or as ingredient for pharmaceutical, cosmetic and/or food applications.

DETAILED DESCRIPTION OF THE INVENTION

The first aspect of the present invention relates to the method for preparing chocolate with agglomerate structure which comprises the following steps:
 a) adding an amount of liquid phase greater than 10% by weight to starting chocolate,
 b) heating and homogenizing the mixture at a temperature between 30° C. and 80° C., and
 c) drying the mixture obtained in step b) by evaporation at a temperature between 30° C. and 200° C. and at pressures between 1000 mbar and 5 mbar, until obtaining a residual moisture less than or equal to 5%.

In the terms of the present invention, "chocolate" is understood as the product comprising a cocoa product, a sugar, and optionally a milk product, an emulsifier, a vegetable fat and/or nuts. In the present invention, the cocoa product is selected from the group consisting of cocoa butter, cocoa mass, reduced fat cocoa (fat content less than 20%) and mixtures thereof. The sugar is selected from the group consisting of carbohydrates, polyalcohols, intensive sweeteners and mixtures thereof. The carbohydrates are selected from the group consisting of glucose, fructose, maltose, sucrose and mixtures thereof, particularly sucrose. The polyalcohols are selected from the group consisting of lactitol, maltitol, sorbitol, xylitol, mannitol and mixtures thereof, particularly maltitol. The intensive sweeteners are selected from the group consisting of aspartame, thaumatin, acesulfame-K, saccharin, particularly saccharin. The milk product is selected from the group consisting of fat component of milk, whey, milk powder (whole or skimmed), lactose and mixtures thereof. The emulsifier is of food use and is added in a proportion from 0% to 3% by weight and is selected from the group consisting of lecithin, polyglycerol polyricinoleate (PGPR), sucrose esters, ammonium phosphatides and mixtures thereof. The vegetable fat relates to one or several mixed vegetable fats, cocoa butter equivalents, which are miscible in any proportion with cocoa butter and are compatible with their physical properties (melting point and temperature of crystallization, melting rate, need of a tempering phase). Furthermore, they are non-lauric vegetable fats rich in symmetrical monounsaturated triglycerides of the POP, POSt and StOSt type [P (palmitic acid), O (oleic acid), St (stearic acid)] and can only be obtained by means of refining or fractionation treatment. According to these criteria the vegetable fat in the present invention (also referred to as equivalent fat) is selected from the group consisting of those obtained from Illipe or Borneo tallow (*Shorea* spp.); palm oil (*Elaeis guineensis Elaeis olifera*); Sal (*Shorea robusta*); Shea (*Butyrospermum parkii*); mango kernel (*Kokum gurgi*) and mixtures thereof. The addition of said equivalent fats to the chocolate is allowed up to a maximum of 5% by weight (Directive 2000/36/EC). Finally, the nuts are selected from the group consisting of hazelnuts, almonds, pistachios, other varieties of nuts (part or whole) and mixtures thereof.

Depending on the composition of the chocolate, the same is classified as dark chocolate, milk chocolate, family milk chocolate, white chocolate, chocolate a la taza, chocolate familiar a la taza, filled chocolate and praline. Chocolate, in the terms of the present invention, is being understood as the dark chocolate, milk chocolate, family milk chocolate, white chocolate, chocolate a la taza, chocolate familiar a la taza and mixtures thereof.

In the terms of the present invention, "dark chocolate" is understood as the product obtained from cocoa products and sugar with not less than 35% of total dry cocoa matter of which not less than 18% is cocoa butter and not less than 14% is fat-free cocoa solids.

"Milk chocolate" is understood as the product obtained from cocoa products, sugar and milk or milk products with not less than 25% of total dry cocoa matter; not less than 14% of dry milk extract; not less than 2.5% of fat-free cocoa solids; not less than 3.5% of fat component of milk, and not less than 25% of total fat (cocoa butter and fat component of milk).

"Family milk chocolate" is understood as the product obtained from cocoa products, sugar and milk or milk products with not less than 20% of total dry cocoa matter; not less than 20% of dry milk extract; not less than 2.5% of fat-free cocoa solids; not less than 5% of fat component of milk, and not less than 25% of total fat (cocoa butter and fat component of milk).

"White chocolate" is understood as the product obtained from cocoa butter, sugar and milk or milk products with not less than 20% of cocoa butter and not less than 14% of dry milk extract, of which not less than 3.5% corresponds to the fat component of milk.

"Chocolate a la taza" is understood as the product obtained from cocoa products, sugar and flour or starch from wheat, rice or maize which contains not less than 35% of total dry cocoa matter, of which not less than 18% is cocoa butter and not less than 14% is fat-free cocoa solids; and at most 8% of flour or starch.

"Chocolate familiar a la taza" is understood as the product obtained from cocoa products, sugar and flour or wheat, rice or maize starch which contains not less than 30% of total dry cocoa matter, of which not less than 18% is cocoa butter and not less than 12% is fat-free cocoa solids; and at most 18% of flour or starch.

In a particular embodiment of step a) of the method of the present invention, the starting chocolate has a fat content between 18% and 53% by weight, particularly between the 25% and the 53% by weight and more particularly between 25% and 35% by weight.

In a particular embodiment of step a) of the method of the present invention, the starting chocolate is selected from the group consisting of dark chocolate, milk chocolate, family milk chocolate, white chocolate, chocolate a la taza, chocolate familiar a la taza and mixtures thereof.

In another particular embodiment, the starting chocolate is dark chocolate. In another particular embodiment, it is white chocolate and in another particular embodiment, it is milk chocolate.

The starting chocolate of step a) is selected from the group consisting of conching chocolate, refined chocolate or a mixture of chocolate ingredients. In terms of the mixture of chocolate ingredients, this comprises the aforementioned: cocoa products, sugars, and optionally emulsifiers, milk products, nuts and/or equivalent fats. In the mixture of ingredients, these can be grounded and/or refined. In a particular embodiment, the starting chocolate comprises a mixture of cocoa mass (between 97% and 99%) and an intensive sweetener (between 1% and 3%), obtaining agglomerated chocolate with a cocoa content of 97% to 99% by weight.

The liquid phase added to the starting chocolate in step a) of the method of the invention comprises a solvent selected from the group consisting of water and hydroethanolic mixtures. Said hydroethanolic mixtures will contain a maximum of ethanol of up to 90% in volume based on the final volume of the mixture, and preferably a maximum of up to 50%. The amount of liquid phase depends on the fat content of the starting chocolate and on the system for drying by evaporation used in step c).

In step c) of drying by evaporation, the evaporation is carried out by conduction or by convection, techniques which are widely described in the state of the art and known by the person skilled in the art. In the terms of the present invention the equipment used for the evaporation by conduction is selected from the group consisting of the vacuum thin layer dryer, roller dryer, vacuum band dryer, vacuum planetary dryer and vacuum tray dryer. On the other hand, the equipment used for the evaporation by convection is selected from the group consisting of the ring dryer, spray or fluidized bed dryer.

In a particular embodiment of step a) liquid phase is added between 10% and 80% by weight. In another particular embodiment between 30% and 70% by weight, in another 30% by weight and in another particular embodiment at least 70% by weight.

In a particular embodiment, the amount of liquid phase added in step a) of the method of the invention is at least 70% by weight, the drying of step c) is carried out by convection and agglomerating chocolate with a fat content less than or equal to 28% by weight. In another particular embodiment, liquid phase is added in a percentage greater than or equal to 30% by weight, preferably between 30% and 40% and yet more preferably 30% of liquid phase, the drying is carried out by conduction and any type of chocolate of which the fat content is between 18% and 53% by weight is agglomerated.

In a particular embodiment of step b) the mixture is heated at between 40° C. and 60° C. In another particular embodiment of this step, the homogenization is carried out by means of mechanical stirring, ultrasounds or static tubular stirring for at least 10 seconds.

As has been previously mentioned, step c) can be carried out by means of systems for evaporation by conduction or by convection. In the systems by conduction, the temperature specified in step c) is the temperature of the heat exchangers (initial and final), whereas in the systems for evaporation by convection it relates to the input and output air temperature.

In a particular embodiment of the method of the invention, in step c) equipment for evaporation by conduction are used and the evaporation is carried out at pressures less than 100 mbar and at a final temperature less than 70° C., preferably between 40° C. and 65° C., until obtaining a product with a residual moisture less than or equal to 5%.

In a particular embodiment, in step c) a planetary evaporator, which is from the different drying systems mentioned the only one provided with system for stirring, is used. In this case, there is a need to regulate the stirring speed such that the evaporation of the solvent is facilitated preventing the destruction of the agglomerate structure of the chocolate. If the agglomerate structure breaks, the butter is released and the product obtained is unusable. During the process for drying with the planetary system it is critical to reduce the stirring at the time when the agglomerate structure is being formed. A particular embodiment of the suitable work sequence using this system consists of maintaining a stirring between 200-100 rpm until evaporating 50% of the liquid phase and subsequently reducing said stirring to 20 rpm until the end of the evaporation process.

In another particular embodiment of step c) the drying is carried out with equipments for evaporation by convection wherein the evaporation of the liquid phase is instantaneous at input air temperatures greater than 100° C. In a particular embodiment, the convection is carried out between 100° C. and 170° C. and in a preferred embodiment, at 150° C. In these equipments the product is moved by the air and/or nitrogen flow until the output temperature is equal to or less than 80° C., particularly between 50 and 80° C.

When the drying is carried out by spraying, the product is subjected to the temperature known in the art as "exhaust temperature" which cannot be directly controlled and depends on the input air or nitrogen temperature, the concentration of the solids in solution and the design of the dryer. In a particular embodiment, for a product of step a) with a liquid phase of 70%, the input air or nitrogen temperature is from 150-200° C. and the output temperature is from 60 to 80° C. Since it is a continuous system, it is difficult to measure the total residence time in the equipment. Generally, the residence time is from 5-100 seconds (Corrigan, 1995. *Thermal analysis of spray dried products*. Thermochimica Acta, 248, 245-258.)

In a particular embodiment of step c) the drying is carried out by conduction or by convection until the chocolate with agglomerate structure obtained has a residual moisture less than or equal to 4% and in another particular embodiment until the final product has a residual moisture less than or equal to 2%.

In a particular embodiment, the method of the invention comprises one or several additional steps of grinding and/or classifying and/or molding by means of heat treatment after step c). Particularly, the additional steps of grinding are carried out in equipment at temperatures between −10° C. and 50° C., and the steps of classifying are performed by venting or by static systems. Thus, agglomerated chocolate in an aggregation state selected from the group consisting of powder, scales, flakes and mixtures thereof is obtained. Agglomerated chocolate with different forms such as sheets or as different decorative shapes (letters, geometrical shapes, etc.) is achieved with the molding of the agglomerated chocolate.

The second aspect of the present invention relates to the chocolate with agglomerate structure obtained by the method of the invention.

The chocolate with agglomerate structure obtained by the method of the present invention, is characterized in that it has the organoleptic characteristics of the conventional chocolate, it is physico-chemically stable at a temperature greater than or equal to 40° C., maintains its flowability at a temperature of up to 50° C. and is crunchy.

In the terms of the present invention, a chocolate is understood as being physico-chemically stable when it maintains its physical state, does not melt and is not chemically altered.

The chocolate is understood as maintaining its flowability at a temperature of up to 50° C. when at said temperature it does not present stickiness and it does not aggregate. This characteristic means that the chocolate with agglomerate structure is more heat resistant than the conventional chocolate, a very interesting characteristic for storage, marketing and use in hot environments.

In the terms of the present invention, crunchy chocolate is understood as that which breaks easily and with little strength. The sensory perception of crunchiness comes both from the hearing and the mouth-feel since the sound can be perceived through air by means of the external hearing or through bone directly from the teeth. Such interesting and novel sensory characteristic means that the agglomerated chocolates have applications very different from those of the ordinary chocolate or reduced fat chocolate powder, such as for example the preparation of crunchy products for cake-making and baking.

In a particular embodiment, the chocolate of agglomerate structure obtained by the method of the present invention is selected from the group consisting of dark chocolate, milk chocolate, family milk chocolate, white chocolate, chocolate a la taza, chocolate familiar a la taza and mixtures thereof. Said chocolate meets the Directive 2000/36/EC and is defined such as has been previously mentioned.

In a particular embodiment the agglomerated chocolate obtained by the method of the invention has a cocoa content between 97% and 99% by weight.

In a particular embodiment the chocolate with agglomerate structure is in an aggregation state selected from the group consisting of powder, scales, flakes and mixtures thereof. Said aggregation states are obtained either directly following steps a)-c) of the method of the invention or after one or several additional steps of grinding and/or classifying. In another particular embodiment, the chocolate agglomerate is in the form of sheets obtained after a step of molding. In another particular embodiment, the chocolate agglomerate is in decorative shape (letters, geometric shapes, etc.) obtained after a step of molding.

In a particular embodiment, the chocolate of agglomerate structure obtained by the method of the present invention is characterized by having a bulk density less than a conventional chocolate. This lower bulk density favors the wettability of the chocolate with agglomerate structure, a significant advantage at the time of obtaining soluble chocolate with the organoleptic characteristics of the conventional chocolate.

Furthermore, in the case of the chocolate with agglomerate structure in powder form, the latter has a high flowability, a characteristic which can be measured in function of different indexes such as the Hausner index and the Carr's index. It is considered that a powder has high flowability when its Hausner index is less than 1.2; medium flowability when its index is between 1.2 and 1.4; and very low flowability when its index is greater than 1.4. Likewise, it is considered that the flowability of a powder is high when its Carr's index is less than 15, is good when its index is in the range from 15 to 20, fine between 20-35, bad between 35-45 and it is a powder with terrible flowability when its index is greater than 45.

The chocolate powder with agglomerate structure obtained following the method of the present invention has a Hausner index less than 1.1 and a Carr's index less than 14.

Finally, a third aspect of the present invention relates to the use of the chocolate with agglomerate structure obtained by the method of the invention for direct consumption or as ingredient for pharmaceutical, cosmetic and/or food applications. Likewise, it relates to the use of the chocolate with agglomerate structure obtained by the method of the invention for its application in the chocolate-making industry, sweet or confectionary industry, baking industry, cookie-making industry, cake-making industry and milk industry. A crunchy sensation is provided with this chocolate. Furthermore, since it is more heat resistant than the conventional chocolate or reduced fat chocolate powder, it can be used successfully in cookie-making or in any process which requires the incorporation of chocolate without it melting. Likewise, the agglomerated chocolate with its organoleptic authentic chocolate profile provides a very valid alternative as the substitute of the cocoa powder in many of its current applications: baking, aromatized drinks, whipped creams, sauces, etc.

Several specific examples of the embodiment of the invention serving to illustrate the invention but in no way intending to limit to the scope of the present invention are detailed below.

EXAMPLES

Example 1

Preparation of milk chocolate with agglomerate structure

Milk chocolate with the following composition is used as the starting chocolate: 41.6% sugar, 25.8% cocoa butter, 12.7% whole milk powder, 9.8% cocoa mass, 8.9% whey, 0.4% lecithin and 0.8% water.

300 g of water are added to 700 g of said chocolate. Said mixture having 70% by weight of chocolate and 30% by weight of water is heated at 55° C. and is homogenized by means of stirring at 500 rpm for 5 minutes.

The mixture is then dried to evaporate the liquid phase. In this case, the drying is performed by conduction in isothermal vacuum tray dryers. The initial temperature is 60° C. and the absolute pressure is from 100 to 5 mbar. The residence time in the equipment is 36000 seconds and the final temperature is 60° C. This method is not performed with stirring. The final product has a residual moisture of 2.4%, its composition is: 40.9% sugar, 25.3% cocoa butter, 12.5% whole milk powder, 9.7% cocoa mass, 8.8% whey and 0.4% lecithin and its total fat content is 33.9%. Following this method, chocolate with aggregation states of scales, flakes or powder is obtained. By means of classifying by sieving, the different aggregates can be separated based on their size.

Example 2

Preparation of Dark Chocolate with Agglomerate Structure

Dark chocolate with the following composition is used as the starting chocolate: 50% sugar, 49.4% cocoa mass and 0.6% water.

10000 g of water is added to 2500 g of said chocolate. Said mixture having 20% chocolate and 80% water is heated at 45° C. and is homogenized by means of stirring at 200 rpm for 15 minutes.

The mixture is then dried to evaporate the liquid phase. In this case, the drying is performed by convection in a spray dryer continuously supplying the mixture obtained in previous the step. The initial temperature of the air is 150° C., the absolute pressure is 1000 mbar and the final temperature of the air is 80° C. This method is not performed with stirring. The final product has a residual moisture of 3.3%, its composition is: 48.7% sugar, 48.0% cocoa and 3.3% water and its total fat content is 25.9%. The aggregation state of the chocolate obtained following this method is powder.

Example 3

Preparation of Milk Chocolate with Polyalcohols with Agglomerate Structure

Sugarless milk chocolate with the following composition is used as the starting chocolate: 49.4% maltitol, 21.6% whole milk powder, 16.3% cocoa mass, 11.8% butter, and 0.9% water.

900 g of water is added to 2100 g of said chocolate. Said mixture having 70% chocolate and 30% water is heated at 58° C. and is homogenized by means of stirring at 200 rpm for 5 minutes.

The mixture is then dried to evaporate the liquid phase. In this case, the drying is performed by conduction in a planetary dryer. The initial temperature is 65° C. and the absolute pressure is from 280 to 13 mbar. The residence time in the equipment is 23400 seconds and the final temperature is 45° C. This method is performed with stirring between 200 and 20 rpm. The final product has a residual moisture of 1.7%, its composition is: 49% maltitol, 21.4% whole milk powder, 16.2% cocoa mass and 11.7% butter and its total fat content is 26%. The aggregation state of the chocolate obtained following this method is powder. This powder is characterized by its great flowability (value 0.82 of Hausner index and 6.14 of Carr's index), its apparent density of 0.71 g/cc and its tap density of 0.86 g/cc.

Example 4

Preparation of White Chocolate with Agglomerate Structure

White chocolate with the following composition is used as the starting chocolate: 50.2% sucrose, 28% whole milk powder, 21% butter and 0.8% water.

1000 g of water is added to 2000 g of said chocolate. Said mixture having 66% chocolate and 33% water is heated at 55° C. and is homogenized by means of stirring at 400 rpm for 3 minutes.

The mixture is then dried to evaporate the liquid phase. In this case, the drying is performed by conduction in a planetary. The initial temperature is 63° C. and the absolute pressure is from 280 to 13 mbar. The residence time in the equipment is 22400 seconds and the final temperature is 40° C. This method is performed with stirring between 200 and 20 rpm. The final product has a residual moisture of 2.8%, its composition is 49.2% sucrose, 27.4% whole milk powder and 20.6% butter and its total fat content is 27.7%.

The aggregation state of the chocolate obtained following this method is powder.

Example 5

Preparation of White Chocolate with Agglomerate Structure

White chocolate with the following composition is used as the starting chocolate: 52.8% sugar, 22.7% cocoa butter, 22.7% whole milk powder, 1% lecithin and 0.8% water.

300 g of a hydroethanolic mixture 65:35 water:ethanol (v/v) is added to 700 g of said chocolate. Said mixture having 70% chocolate and 30% hydroethanolic mixture is heated at 50° C. and is homogenized by means of stirring at 500 rpm for 5 minutes.

The mixture is then dried to evaporate the liquid phase. In this case, the drying is performed by conduction in isothermal vacuum tray dryers provided with a suitable condensation system. The initial temperature is 50° C. and the absolute pressure is from 250 to 50 mbar, the final temperature is increased in the last third of the method to 60° C. ending the method at 15 mbar of absolute pressure. The residence time in the equipment is 30000 seconds. This method is not performed with stirring. The final product has a residual moisture of 1.7%, its composition is: 52.4% sugar, 22.5% cocoa butter, 22.5% whole milk powder and 0.9% lecithin and its total fat content is 28.4%. Following this method, chocolate with aggregation states of scales, flakes or powder is obtained. By means of classifying by sieving, the different aggregates can be separated based on their size.

The invention claimed is:

1. A process for preparing a chocolate with agglomerate structure which comprises the following steps:
    a) mixing a starting chocolate with an amount of liquid phase which amount is greater than 10% by weight relative to the amount of starting chocolate, wherein the liquid phase is selected from the group consisting of water and hydroethanolic mixtures,
    b) heating and homogenizing the mixture obtained in step a) at a temperature between 30° C. and 80° C, and
    c) drying the mixture obtained in step b) by evaporation at a temperature between 30° C, and 200° C, and at a pressure between 1000 mbar and 5 mbar, until the chocolate with agglomerate structure having a residual moisture of less than or equal to 5% is obtained.

2. The process according to claim 1, wherein in step a) the starting chocolate is conched, refined or a mixture of chocolate ingredients.

3. The process according to claim 1, wherein in step a) the starting chocolate has a fat content between 18% and 53% by weight.

4. The process according to claim 3, wherein in step a) the starting chocolate has a fat content between 25% and 53% by weight.

5. The process according to claim 4, wherein in step a) the starting chocolate has a fat content between 25% and 35% by weight.

6. The process according to claim 3, wherein in step a) the starting chocolate is selected from the group consisting of dark chocolate, milk chocolate, family milk chocolate, white chocolate, chocolate a la taza, chocolate familiar a la taza and mixtures thereof.

7. The process according to claim 6, wherein step c) is carried out by conduction or convection until the chocolate with agglomerate structure having a residual moisture less than or equal to 4% is obtained.

8. The process according to claim 7, wherein step c) is carried out until the chocolate with agglomerate structure having a residual moisture less than or equal to 2% is obtained.

9. The process according to claim 6, wherein step c) is carried out in equipment for evaporation by conduction at pressures less than 100 mbar and a final temperature less than 70° C.

10. The process according to claim 6, wherein step c) is carried out with equipment for evaporation by convection at an output temperature equal to or less than 80° C.

11. The process according to claim 1, wherein in step a) the starting chocolate is selected from the group consisting of dark chocolate, milk chocolate, family milk chocolate, white chocolate, chocolate a is taza, chocolate familiar a la taza and mixtures thereof.

12. The process according to claim 1, wherein step c) is carried out by conduction or convection until the chocolate with agglomerate structure having a residual moisture less than or equal to 4% is obtained.

13. The process according to claim 12, wherein step c) is carried out until the chocolate with agglomerate structure having a residual moisture less than or equal to 2% is obtained.

14. The process according to claim 1, wherein step c) is carried out in equipment for evaporation by conduction at pressures less than 100 mbar and a final temperature less than 70° C.

15. The process according to claim 1, wherein step c) is carried out with equipment for evaporation by convection at an output temperature equal to or less than 80° C.

16. The process according to claim 1, further comprising one or several additional steps of grinding, classification, and/or molding after step c).

17. Chocolate produced by the process of claim 1, wherein the chocolate has the organoleptic characteristics of conventional chocolate, is physico-chemically stable at a temperature greater than or equal to 40° C, maintains its flowability up to temperatures close to 50° C, and is crunchy.

18. The chocolate according to claim 17, which is selected from the group consisting of dark chocolate, milk chocolate, family milk chocolate, white chocolate, chocolate familiar, chocolate familiar a is taza and mixtures thereof, and which is characterized in that it has different aggregation states selected from the group consisting of powder, scales, flakes, sheets, different decorative shapes and mixtures thereof.

19. The chocolate according to claim 17, wherein the cocoa content of the chocolate is between 97 and 99% by weight.

20. A process for preparing a product comprising mixing the chocolate of claim 17 with a pharmaceutical, cosmetic or food ingredient.

\* \* \* \* \*